United States Patent
Kim

(10) Patent No.: US 9,941,797 B2
(45) Date of Patent: Apr. 10, 2018

(54) SWITCH CONTROL CIRCUIT AND POWER SUPPLY DEVICE INCLUDING THE SAME

(71) Applicant: FAIRCHILD KOREA SEMICONDUCTOR LTD., Bucheon-si (KR)

(72) Inventor: Taesung Kim, Incheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 203 days.

(21) Appl. No.: 14/597,660

(22) Filed: Jan. 15, 2015

(65) Prior Publication Data

US 2015/0207416 A1  Jul. 23, 2015

Related U.S. Application Data

(60) Provisional application No. 61/928,521, filed on Jan. 17, 2014.

(30) Foreign Application Priority Data

Dec. 29, 2014  (KR) .................. 10-2014-0192631

(51) Int. Cl.
*H02M 3/335* (2006.01)
*H02M 1/00* (2006.01)

(52) U.S. Cl.
CPC .................. *H02M 3/33507* (2013.01); *H02M 2001/0009* (2013.01)

(58) Field of Classification Search
CPC ..... H02M 3/33507; H02M 2001/0009; H02M 3/33523; H02M 2001/0032
See application file for complete search history.

(56) References Cited

U.S. PATENT DOCUMENTS

| | | |
|---|---|---|
| 7,310,244 B2 | 12/2007 | Yang et al. |
| 7,869,235 B2 | 1/2011 | Lin et al. |
| 8,199,538 B2 | 6/2012 | Piper |
| 8,391,028 B2 | 3/2013 | Yeh |
| 8,526,203 B2 | 9/2013 | Huang et al. |
| 8,711,583 B2 | 4/2014 | Yang et al. |
| 8,780,590 B2 | 7/2014 | So et al. |
| 8,947,894 B2 | 2/2015 | Zhang et al. |
| 9,024,598 B2 | 5/2015 | Hasegawa et al. |
| 9,431,913 B2 * | 8/2016 | Kuang .................. H02M 3/156 |
| 2005/0169017 A1 | 8/2005 | Muegge et al. |
| 2006/0056204 A1 | 3/2006 | Yang et al. |
| 2006/0261860 A1 * | 11/2006 | Yamada ................. H02M 3/156 327/77 |
| 2012/0169245 A1 * | 7/2012 | Chen .................. H02M 3/33523 315/223 |
| 2013/0215649 A1 * | 8/2013 | Huang ............... H02M 3/33523 363/21.17 |

(Continued)

*Primary Examiner* — Henry Lee, III
(74) *Attorney, Agent, or Firm* — Okamoto & Benedicto LLP

(57) ABSTRACT

The power supply device includes a power switch, a rectification diode which rectifies a supplied current in accordance with a switching operation of the power switch to generate an output current, and a switch control circuit which averages a detected sensing voltage corresponding to a sensing voltage which follows a current which flows through the power switch to generate an output current estimating voltage corresponding to the output current.

19 Claims, 7 Drawing Sheets

(56) References Cited

U.S. PATENT DOCUMENTS

2013/0294118 A1\* 11/2013 So ............... H02M 3/33507
                                                                                  363/21.16
2015/0102786 A1\* 4/2015 Kim ............... H02M 1/4225
                                                                                   323/208

\* cited by examiner

SWITCH CONTROL CIRCUIT AND POWER SUPPLY DEVICE INCLUDING THE SAME

CROSS-REFERENCE TO RELATED APPLICATION

This application claims priority to and the benefits of U.S. Patent Application No. 61/928,521 filed in the USPTO on Jan. 17, 2014, and Korean Patent Application No. 10-2014-0192631, filed with the Korean Intellectual Property Office on Dec. 29, 2014, the entire contents of which are incorporated herein by reference.

BACKGROUND (a) Technical Field

Exemplary embodiments of the invention relate to a switch control circuit and a power supply device including the same.

(b) Description of the Related Art

In the related art, a circuit which estimates an output current includes lots of components. For example, an output current estimating circuit of the related art includes a plurality of resistors, capacitors, and current sources. However, due to permissible errors (tolerance) of the plurality of resistors, capacitors, and current sources, an error occurs when the output current is estimated.

Therefore, the output current estimating circuit is not only complex but also has an estimation error.

The above information disclosed in this Background section is only for enhancement of understanding of the background of the invention and therefore it may contain information that does not form the prior art that is already known in this country to a person of ordinary skill in the art.

SUMMARY

The invention has been made in an effort to provide a switch control circuit which may estimate an output current with a simple configuration and a power supply device including the same.

An exemplary embodiment of the invention provides a power supply device including a power switch, a rectification diode which rectifies a supplied current in accordance with a switching operation of the power switch to generate an output current, and a switch control circuit which averages a detected sensing voltage corresponding to a sensing voltage that follows a current flowing in the power switch to generates an output current estimating current corresponding to the output current.

The switch control circuit may detect a peak of the sensing voltage for every switching cycle of the power switch to generate the detected sensing voltage.

The switch control circuit may calculate or detect an average of the sensing voltage for every turn-on period of the power switch to generate the detected sensing voltage.

The switch control circuit may include a low pass filter and supply the detected sensing voltage to the low pass filter during a discharging period when a current flows through the rectification diode during a switching cycle of the power switch and the low pass filter may average an input during the switching cycle of the power switch to generate the output current estimating voltage.

The switch control circuit may include a low pass filter and first and second resistors which resistively divide the detected sensing voltage, and may supply the resistively divided detected sensing voltage to the low pass filter during a discharging period when a current flows through the rectification diode during a switching cycle of the power switch and the low pass filter may average an input during the switching cycle of the power switch to generate the output current estimating voltage.

The switch control circuit may include a low pass filter and first and second resistors which resistively divide the output of the low pass filter, supply the detected sensing voltage to the low pass filter during a discharging period when a current flows through the rectification diode during a switching cycle of the power switch and the low pass filter may average an input during the switching cycle of the power switch to generate an output, and the output of the low pass filter may be divided by the first and second resistors to generate the output current estimating voltage.

The switch control circuit may include a low pass filter and an amplifying unit which amplifies the detected sensing voltage and supply the amplified detected sensing voltage to the low pass filter during a discharging period when a current flows through the rectification diode during a switching cycle of the power switch and the low pass filter may average an input during the switching cycle of the power switch to generate the output current estimating voltage.

The switch control circuit may include a low pass filter and an amplifying unit which amplifies an output of the low pass filter and supply the detected sensing voltage to the low pass filter during a discharging period when a current flows through the rectification diode during a switching cycle of the power switch and the low pass filter may average an input during the switching cycle of the power switch to generate an output, and the output of the low pass filter may be amplified by the amplifying unit to generate the output current estimating voltage.

The switch control circuit may include a low-pass filter and a current mirror which tracks a first current corresponding to the detected sensing voltage at a predetermined ratio to generate a second current and generates a copied voltage corresponding to the second current, and supplies the copied voltage to the low pass filter during a discharging period when a current flows through the rectification diode during a switching cycle of the power switch and the low pass filter may average an input during the switching cycle of the power switch to generate the output current estimating voltage.

Another exemplary embodiment of the invention provides, a switch control circuit which controls a switching operation of a power switch, including: a sensing voltage detector which generates a detected sensing voltage corresponding to a sensing voltage in accordance with a current which flows through the power switch; and an output current estimator which averages the detected sensing voltage to generate an output current estimating voltage corresponding to an output current which is controlled in accordance with a switching operation of the power switch.

The sensing voltage detector may detect a peak of the sensing voltage for every switching cycle of the power switch to generate the detected sensing voltage.

The sensing voltage detector may calculate or detect an average of the sensing voltage for every turn-on period of the power switch to generate the detected sensing voltage.

The output current estimator may include a low pass filter and a first switch which supplies the detected sensing voltage to the low pass filter during a discharging period and the discharging period may be a period when a current flows through a rectification diode which generates the output current.

The output current estimator may further include a second switch which supplies a predetermined reference voltage during the remaining period except for the discharging period in the switching cycle of the power switch.

The output current estimator may further include first and second resistors which resistively divide the detected sensing voltage and, the detected sensing voltage which is resistively divided during the discharging period may be supplied to the low pass filter through the first switch.

The output current estimator may further include first and second resistors which resistively divide an output of the low pass filter, and an output of the low pass filter may be divided by the first and second resistors to generate the output current estimating voltage.

The output current estimator may further include an amplifying unit which amplifies the detected sensing voltage, and the amplified detected sensing voltage may be supplied to the low pass filter during the discharging period.

The output current estimator may further include an amplifying unit which amplifies an output of the low pass filter and an output of the low pass filter may be amplified by the amplifying unit to generate the output current estimating voltage.

The output current estimator may further include a current mirror which tracks the first current corresponding to the detected sensing voltage at a predetermined ratio to generate a second current and generates a copied voltage corresponding to the second current and the copied voltage may be supplied to the low pass filter during the discharging period.

The switch control circuit may control the switching operation of the power switch in accordance with a result of comparing a comparison voltage corresponding to a difference between the output current estimating voltage and a predetermined reference voltage and any one of the sensing voltage and a triangular wave.

Yet another exemplary embodiment of the invention provides a switch control circuit which controls a switching operation of a power switch, including a sensing voltage detector which generates a detected sensing voltage corresponding to a sensing voltage in accordance with a current which flows through the power switch; an error amplifier which amplifies a difference between the detected sensing voltage and the reference voltage; and a capacitor which is coupled to an output terminal of the error amplifier. An output of the error amplifier may be averaged by the capacitor, which acts a role as low pass filter.

Therefore, provided are a switch control circuit which may estimate an output current with a simple configuration and a power supply device including the same.

DETAILED DESCRIPTION OF THE EMBODIMENTS

Figure 1:
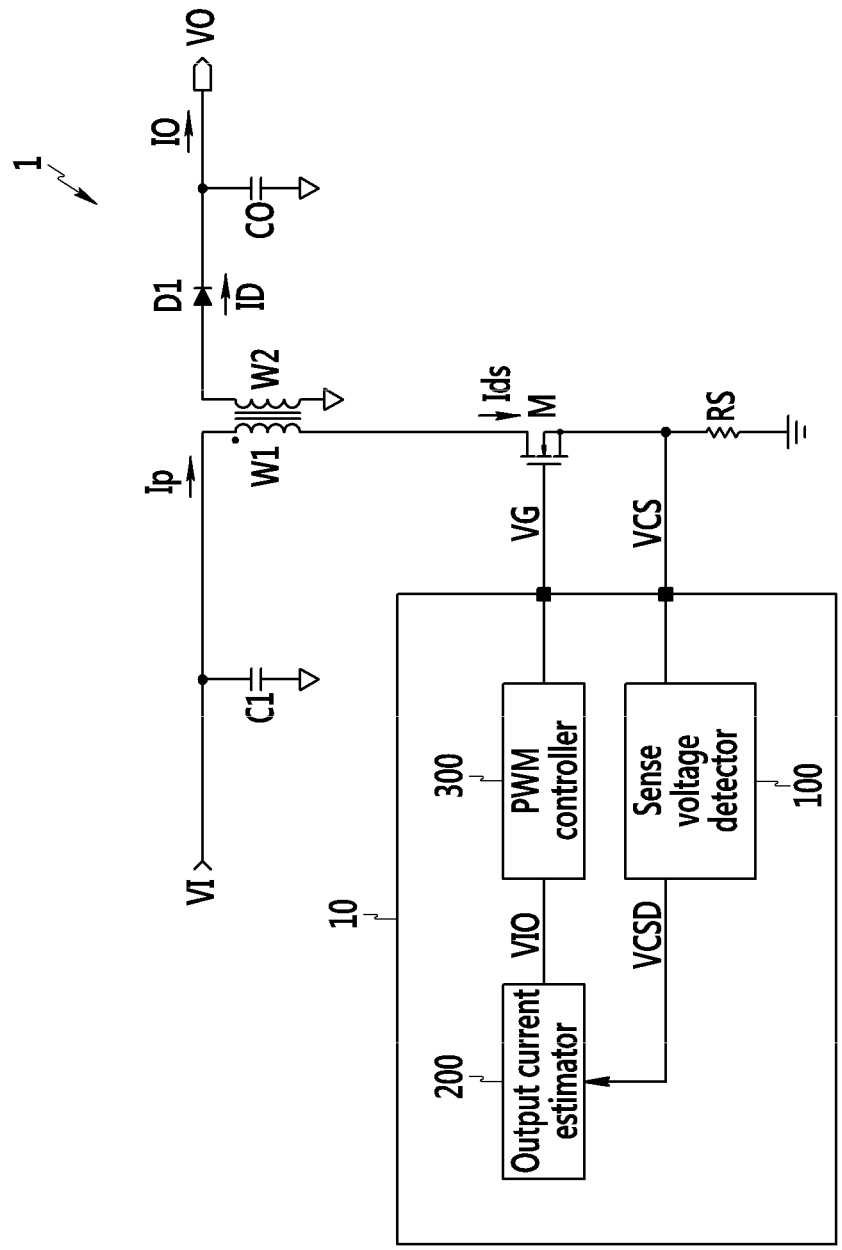
FIG. 1 is a diagram illustrating a power supply device according to an exemplary embodiment.

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a diagram illustrating a power supply device according to an exemplary embodiment.

A power supply device 1 includes a capacitor CI, a primary winding W1, a secondary winding W2, a rectification diode D1, a capacitor CO, a power switch M, a sensing resistor RS, and a switch control circuit 10. The switch control circuit 10 includes a sensing voltage detector 100, an output current estimator 200 and a PWM controller 300.

The capacitor CI is connected between an end of the primary winding W1 and a primary side ground. An input voltage VI is smoothened by the capacitor CI.

The input voltage VI is transmitted to the end of the primary winding W1 and a drain of the power switch M is connected to the other end of the primary winding W1. The sensing resistor RS is connected between a source of the power switch M and the ground. A gate voltage VG is applied to a gate of the power switch M. The power switch M controls power which is transmitted from the primary side to the secondary side. The primary side and the secondary side are isolated.

Since the power switch M is an n channel transistor, a level at which the power switch M is turned on is a high level and a level at which the power switch M is turned off is a low level.

An anode of the rectification diode D1 is connected to one end of the secondary winding W2. When the rectification diode D1 is electrically conducted, a current which flows through the secondary winding W2 is transmitted to the capacitor CO and a load (not illustrated). Hereinafter, an average of a current which flows through rectification diode D1 is referred to as an output current IO.

When the power switch M is turned on, the current IP flows through the primary winding W1 and energy is stored in the primary winding W1. During this period, the rectification diode D1 is in a non-conductive state. When the power switch M is turned off and the rectification diode D1 is electrically conducted, the energy stored in the primary winding W1 is discharged through the secondary winding W2 and the current which is generated in the secondary winding W2 flows through the rectification diode D1.

The switch control circuit 10 controls a switching operation of the power switch M using a value obtained by estimating the output current IO. During a period when the power switch M is turned on, a sensing voltage VCS is determined by the switch current Id and a sensing resistance RS.

The sensing voltage detector 100 detects a peak of the sensing voltage VCS at every switching cycle. Alternatively, the sensing voltage detector 100 may detect an average of the sensing voltage VCS during the turn-on period of the power switch M at every switching cycle. The peak or the average of the sensing voltage VCS is information on sensing voltage VCS generated at every switching cycle and may also be information on a switch current Id. The sensing voltage detector 100 outputs a detected sensing voltage VCSD in accordance with the detected peak or average.

The output current estimator 200 averages the detected sensing voltage VCSD to generate an output current estimating voltage VIO.

The PWM controller 300 generates a gate voltage VG which controls the switching operation of the power switch M in accordance with the output current estimating voltage VIO. For example, a comparison voltage in accordance with a difference between the output current estimating voltage VIO and a reference voltage is generated and an turn-on period of the power switch M may be determined in accordance with a result of comparing the comparison voltage and the sensing voltage VCS or a triangular wave which is internally generated.

Hereinafter, an output current estimator according to an exemplary embodiment will be described with reference to FIG. 2.

Figure 2:
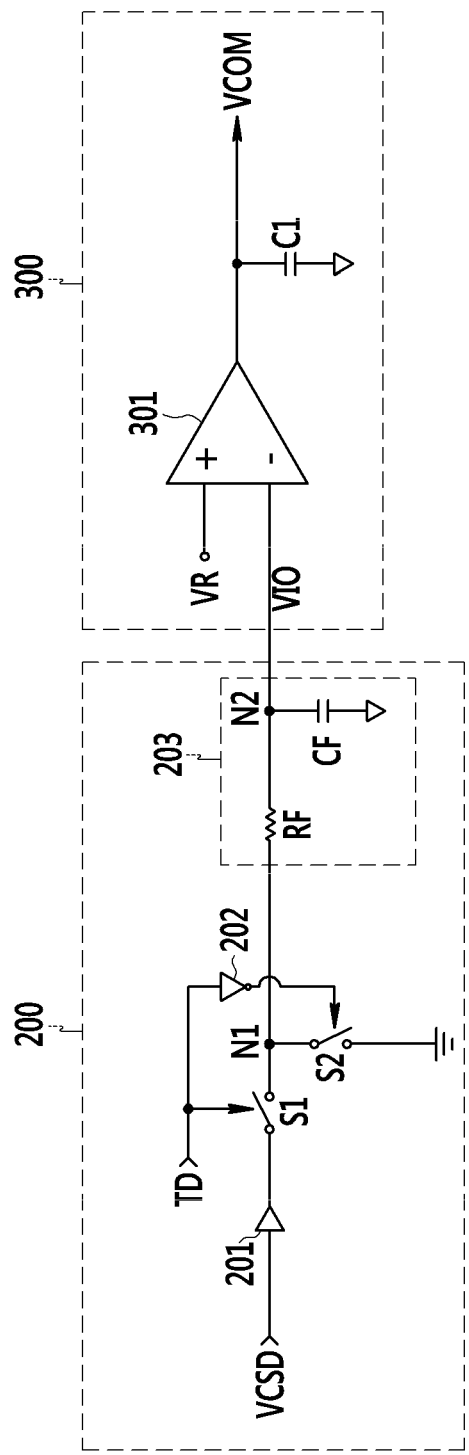
FIG. 2 is a diagram illustrating an output current estimator according to a first exemplary embodiment.

FIG. 2 is a diagram illustrating an output current estimator according to a first exemplary embodiment.

In FIG. 2, the output current estimator 200 and partial configurations of the PWM controller 300 are illustrated.

The output current estimator 200 includes a buffer 201, two switches S1 and S2, an inverter 202, and a low pass filter 203. As an example, the low pass filter 203 illustrated in FIG. 2 includes a resistor RF and a capacitor CF. However, the exemplary embodiment is not limited thereto and the low pass filter 203 may be designed in various ways.

In FIG. 2, even though an output current estimator 200 which separately includes the low pass filter is illustrated, the low pass filter may not be included in the output current estimator 200. For example, a capacitor C1 in the PWM controller 300 may be substituted for the low pass filter 203. By doing this, instead of the output current estimating voltage VIO, the detected sensing voltage VCSD is input to an inversion terminal (−) of an error amplifier 301 and an output of the error amplifier 301 is averaged by the capacitor C1, which acts a role as low pass filter.

The detected sensing voltage VCSD is transmitted to the low pass filter 203 through the buffer 201 during a discharging period and the low pass filter 203 averages the detected sensing voltage VCSD to generate an output current estimating voltage VIO.

The discharging period refers to a period when a current flows through the rectification diode D1. Since the power supply device illustrated in FIG. 1 is a flyback converter, the current which is generated in the secondary winding W2 flows through the rectification diode D1. In FIG. 1, the rectification diode D1 is located at a secondary side, but the position of the rectification diode D1 of the invention is not limited thereto. For example, when the power supply device is, for example, a buck converter, a boost converter, or a buck-boost converter, the rectification diode D1 may be located at a primary side.

The position of the rectification diode D1 is not limited to a converter type and the rectification diode D1 means a configuration which rectifies a supplied current in accordance with the switching operation of the power switch to generate an output current. The output current IO is controlled in accordance with the switching operation of the power switch M.

The output current IO is determined by a result obtained by averaging the secondary side current which flows through rectification diode D1 during the discharging period. A current which flows through the rectification diode D1 during the off-period of the power switch M has a waveform which is increased at a time when the power switch M is turned off and then gradually decreased.

The secondary side current which is generated at a time when the power switch M is turned off is determined in accordance with the peak of the switch current Id (or an average of the switch current Id during the turn-on period of the power switch M). Accordingly, the output current IO depends on a result of multiplying the peak (or the average) of the switch current Id during the turn-on period of the power switch M and the discharging period. Since the sensing voltage VCS is determined in accordance with the switch current Id, the output current IO may be estimated as the following Equation 1.

$$\text{Output current }(IO) = k^*(\text{Peak of }VCS)^*(\text{discharging period})/(\text{switching cycle of power switch}) \quad \text{[Equation 1]}$$

Here, instead of the peak of the sensing voltage VCS, an average of the sensing voltage VCS may be used. k is a proportional factor and is appropriately set in accordance with a design. For example, k may be set to different values when the peak of the sensing voltage VCS is used and when the average of the sensing voltage VCS is used, respectively.

The output current IO is estimated as described above and a result of low-pass filtering of the detected sensing voltage VCSD during the discharging period in the unit of the switching cycle of the power switch M corresponds to (Peak of VCS)*(discharging period)/(switching cycle of power switch) in Equation 1.

The output current estimator 200 according to the exemplary embodiment supplies the detected sensing voltage VCSD to the low pass filter 203 during the discharging period and supplies a primary side ground voltage to the low pass filter 203 during the remaining period except for the discharging period in the switching cycle of the power switch M to generate an output current estimating voltage VIO. The primary side ground voltage is an example of the predetermined reference voltage. Instead of the primary side ground voltage, a different level of voltage may be applied.

The low pass filter 203 averages a voltage which is supplied during the switching cycle of the power switch M to generate an output current estimating voltage VIO which is an output. In this case, the detected sensing voltage VCS is supplied to the low pass filter 203 only during the discharging period in the switching cycle and the primary side ground voltage is supplied during the remaining period. By the operation as described above, division by the switching cycle of the power switch in Equation 1 is implemented.

In accordance with a discharging period signal TD which indicates a discharging period, a switch S1 is controlled and in accordance with a signal obtained when the discharging period signal TD is inverted by an inverter 202, a switch S2 is controlled. The discharging period signal TD is a high level during the discharging period and the switch S1 and the switch S2 are turned on in accordance with a high level signal.

One end of the switch S1 is connected to the buffer 201 and the other end of the switch S1 is connected to a node N1.

One end of the switch S2 is connected to the node N1 and the other end of the switch S2 is connected to the primary side ground.

The resistor RF is connected between the node N1 and a node N2 and the capacitor CF is connected between the node N2 and the primary side ground. The node N1 is an input terminal of the low pass filter 203 and the node N2 is an output terminal of the low pass filter 203.

The switch S1 is turned on by the discharging period signal TD during the discharging period, so that the detected sensing voltage VCSD is transmitted to the low pass filter 203 and the switch S2 is turned on during non-discharging period, so that the primary ground voltage is supplied to the low pass filter 203.

The discharging period signal TD is generated in the switch control circuit 10. For example, a period from a time when the power switch M is turned off to a time when an auxiliary voltage VAUX which is a voltage at both terminals of an auxiliary winding W3 starts to be decreased during the turn-off period may be set as the discharging period TD.

When the exemplary embodiment illustrated in FIG. 1 is a flyback converter, the time when the auxiliary voltage VAUX starts to be decreased may be set as an ending time of the discharging period, but the invention is not limited thereto. In a non-isolation type converter, a time when a voltage at both ends of the inductor starts to be decreased during the period when the power switch which is connected to the inductor is turned off may be set as an ending time of the discharging period.

The error amplifier 301 and the capacitor C1 which are components of the PWM controller 300 generate a comparison voltage VCOM in accordance with the output current estimating voltage VIO. The error amplifier 301 amplifies a difference between a reference voltage VR which is input to a non-inversion terminal (+) and an output current estimating voltage VIO which is input to the inversion terminal (−) and outputs the difference. An output of the error amplifier 301 is compensated by the capacitor C1, so that a comparison voltage VCOM is generated.

The PWM controller 300 compares the comparison voltage VCOM and the sensing voltage VCS and turns off the power switch M at a time when the sensing voltage VCS reaches the comparison voltage VCOM. Alternatively, the comparison voltage VCOM and the triangular wave which is internally generated are compared to control the power switch M to be turned off. Further, the PWM controller 300 may be synchronized with an oscillator signal which determines a switching frequency of the power switch M to turn on the power switch M.

Figure 3:
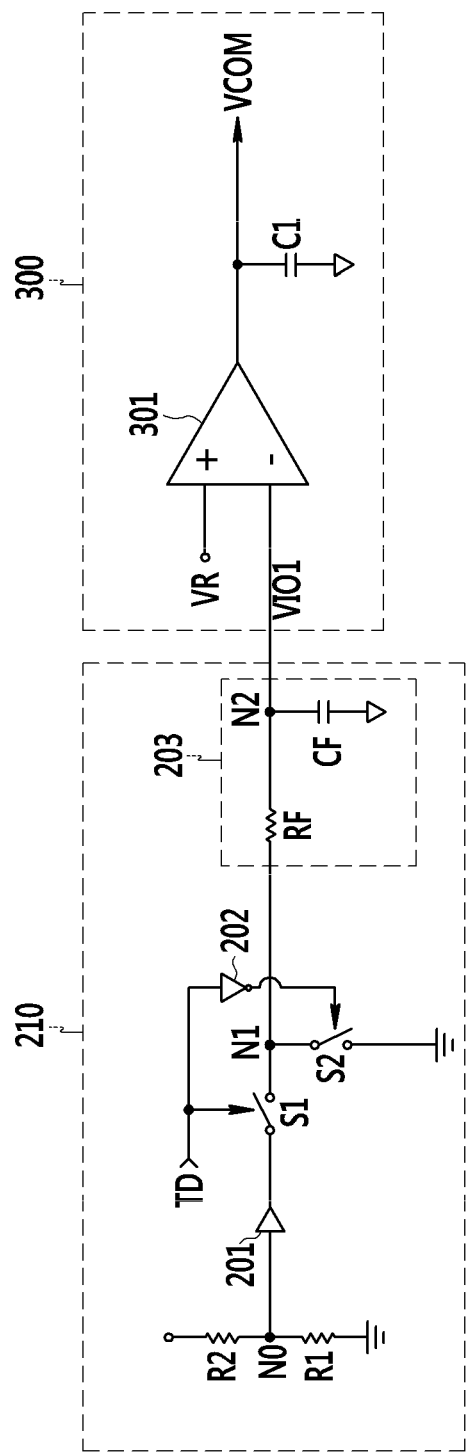
FIG. 3 is a diagram illustrating an output current estimator according to a second exemplary embodiment.

FIG. 3 is a diagram illustrating an output current estimator according to a second exemplary embodiment.

The second exemplary embodiment illustrated in FIG. 3 further includes a configuration which resistively divides a detected sensing voltage VCS as compared with the first exemplary embodiment. The same configuration as the first exemplary embodiment is denoted by the same reference numeral and redundant description will be omitted.

The output current estimator 210 further includes two resistors R1 and R2 which are connected in series.

The resistor R1 and the resistor R2 are connected in series and a detected sensing voltage VCSD is applied to one end of the resistor R2 and the other end of the resistor R2 and one end of the resistor R1 are connected to a node NO. The other end of the resistor R2 is connected to a primary side ground. A voltage of the node NO is transmitted to a low pass filter 203 through a buffer 201 during a period when a switch S1 is turned on, that is, a discharging period.

The detected sensing voltage VCSD is divided by the resistor R1 and the resistor R2, so that a voltage range of the output current estimating voltage VIO1 may be appropriately adjusted. By doing this, the output current estimating voltage VIO1 may be adjusted to be appropriate for the voltage range limited at the switch control circuit 10. For example, in the PWM controller 300, a range of the output current estimating voltage VIO1 may be limited in accordance with a reference voltage VR and in this case, the output current estimating voltage VIO1 is divided by the resistors R1 and R2 so as to be appropriate for the limited range.

Positions of the resistor R1 and the resistor R2 are not limited to the second exemplary embodiment illustrated in FIG. 3. The output current estimator resistively divides the voltage which passes through the low pass filter 203 to generate an output current estimating voltage VIO2.

Figure 4:
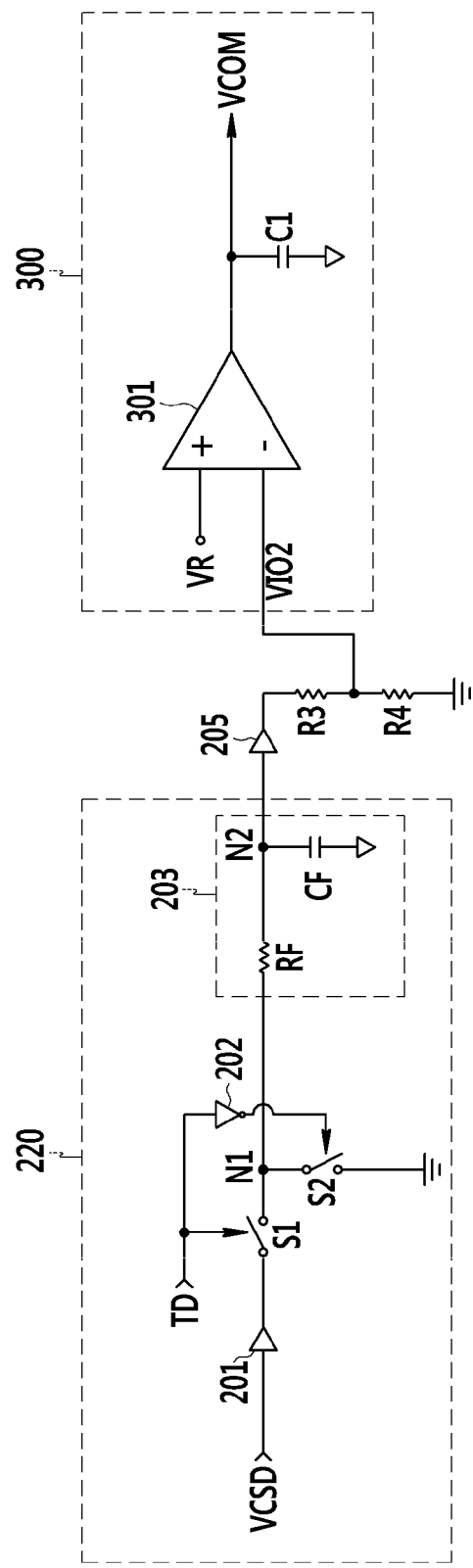
FIG. 4 is a diagram illustrating an output current estimator according to a third exemplary embodiment.

FIG. 4 is a diagram illustrating an output current estimator according to a third exemplary embodiment.

As compared with the second exemplary embodiment, in the third exemplary embodiment, positions of a resistor R3 and a resistor R4 are changed to an output terminal of the low pass filter 203. An output current estimator 220 according to the third exemplary embodiment further includes the resistor R3, the resistor R4, and a buffer 205 as compared with the first exemplary embodiment.

The same configuration as the exemplary embodiments described above is denoted by the same reference numeral and redundant description will be omitted.

An input terminal of the buffer 205 is connected to a node N2 which is an output terminal of the low pass filter 203 and outputs an output of the low pass filter 203. The resistor R3 and the resistor R4 are connected in series, the output of the low pass filter 203 is applied to one end of the resistor R4, and the other end of the resistor R4 and one end of the resistor R3 are connected to the node N3. The other end of the resistor R3 is connected to a primary side ground. A voltage of the node N3 is an output current estimating voltage VIO2.

The invention is not limited to dividing the output current estimating voltage VIO by resistors to reduce a scale thereof. The output current estimating voltage VIO may be amplified to increase the scale.

Figure 5:
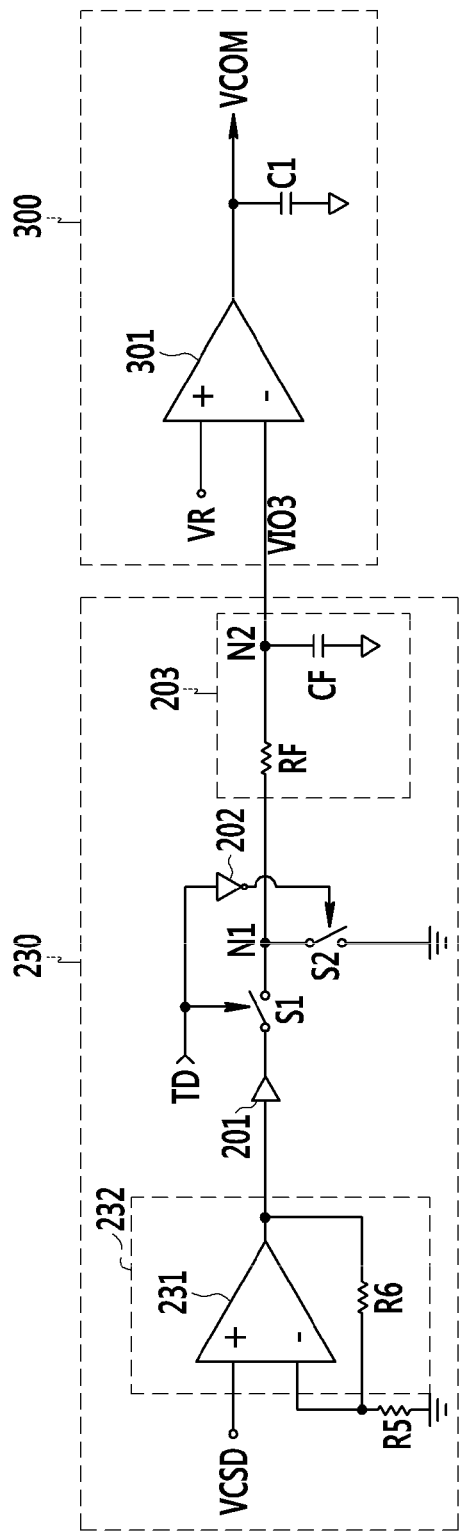
FIG. 5 is a diagram illustrating an output current estimator according to a fourth exemplary embodiment.

FIG. 5 is a diagram illustrating an output current estimator according to a fourth exemplary embodiment.

An output current estimator 230 according to a fourth exemplary embodiment further includes a unit (hereinafter, referred to as an amplifying unit) 232 which amplifies a detected sensing voltage VCS, as compared with the first exemplary embodiment. The same configuration as the first exemplary embodiment described above is denoted by the same reference numeral and redundant description will be omitted.

The amplifying unit 232 further includes an error amplifier 231, a resistor R5, and a resistor R6. A detected sensing voltage VCSD is applied to a non-inversion terminal (+) of the error amplifier 231, the resistor R6 is connected between an inversion terminal (−) and an output terminal of the error amplifier 231, and the resistor R5 is connected between the inversion terminal (−) and a primary side ground.

The amplifying unit 232 amplifies the detected sensing voltage VCSD which is input to the non-inversion terminal (+) at a predetermined ratio (R5+R6)/R6 and outputs the amplified detected sensing voltage VCSD. The voltage amplified as described above is transmitted to a low pass filter 203 through the buffer 201 during a discharging period. The output current estimating voltage VIO3 which is output by the low pass filter 203 is a voltage which is amplified from the output current estimating voltage VIO of the first exemplary embodiment by a predetermined ratio ((R5+R6)/R5).

A position of the amplifying unit 232 is not limited to the fourth exemplary embodiment illustrated in FIG. 5. An output current estimator may amplify a voltage which passes through the low pass filter 203 to generate an output current estimating voltage VIO4.

Figure 6:
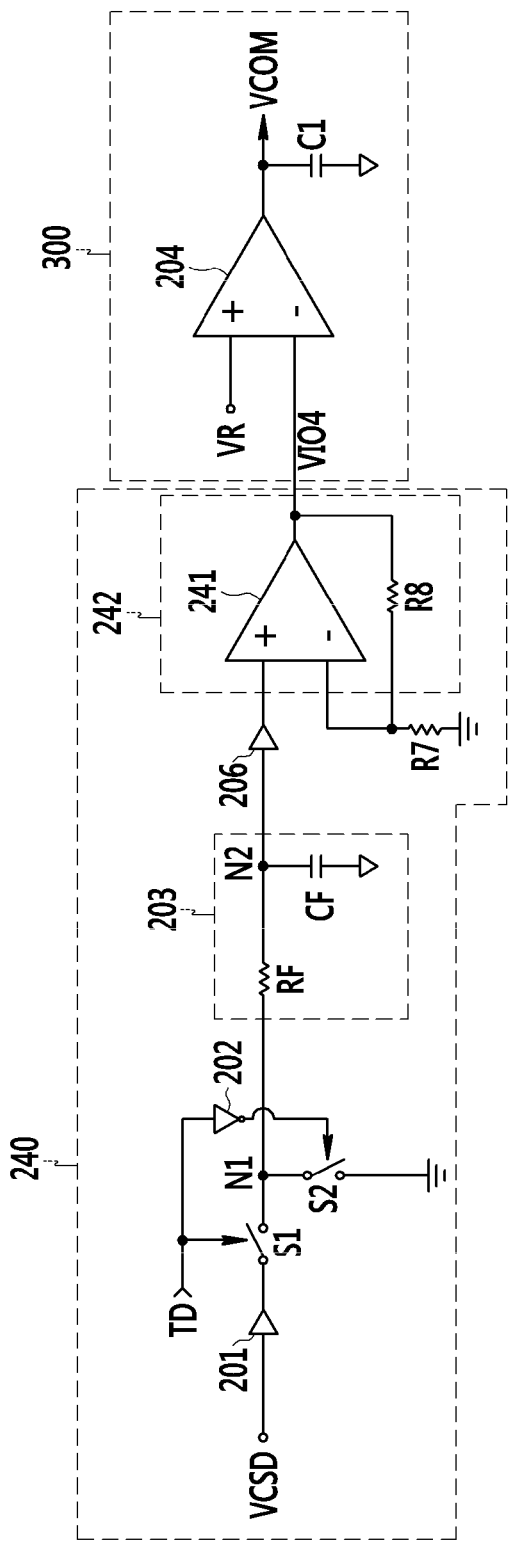
FIG. 6 is a diagram illustrating an output current estimator according to a fifth exemplary embodiment.

FIG. 6 is a diagram illustrating an output current estimator according to a fifth exemplary embodiment.

As compared with the fourth exemplary embodiment, in the output current estimator 240 according to the fifth exemplary embodiment, a position of the amplifying unit 242 is changed to an output terminal of a low pass filter 203. The output current estimator 240 according to the fifth exemplary embodiment further includes an amplifying unit 242, as compared with the first exemplary embodiment. The same configuration as the first exemplary embodiment described above is denoted by the same reference numeral and redundant description will be omitted.

The amplifying unit 242 further includes an error amplifier 241, a resistor R7, a resistor R8, and a buffer 206.

An input terminal of the buffer 206 is connected to a node N2 which is an output terminal of the low pass filter 203 and outputs an output of the low pass filter 203. The output of the low pass filter 203 is applied to a non-inversion terminal (+) of the error amplifier 241, a resistor R8 is connected between an inversion terminal (−) and the output terminal of the error amplifier 241, and a resistor R7 is connected between the inversion terminal (−) and a primary side ground.

The amplifying unit 232 amplifies the output of the low pass filter 203 which is applied to the non-inversion terminal (+) at a predetermined ratio ((R7+R8)/R7) and outputs the amplified output. Therefore, the output current estimating voltage VIO4 is a voltage which is amplified by a predetermined ratio ((R7+R8)/R7), as compared with the output current estimating voltage VIO of the first exemplary embodiment.

An exemplary variation of the output current estimator is not limited to the above-described exemplary embodiments, but may further include a current mirror.

Figure 7:
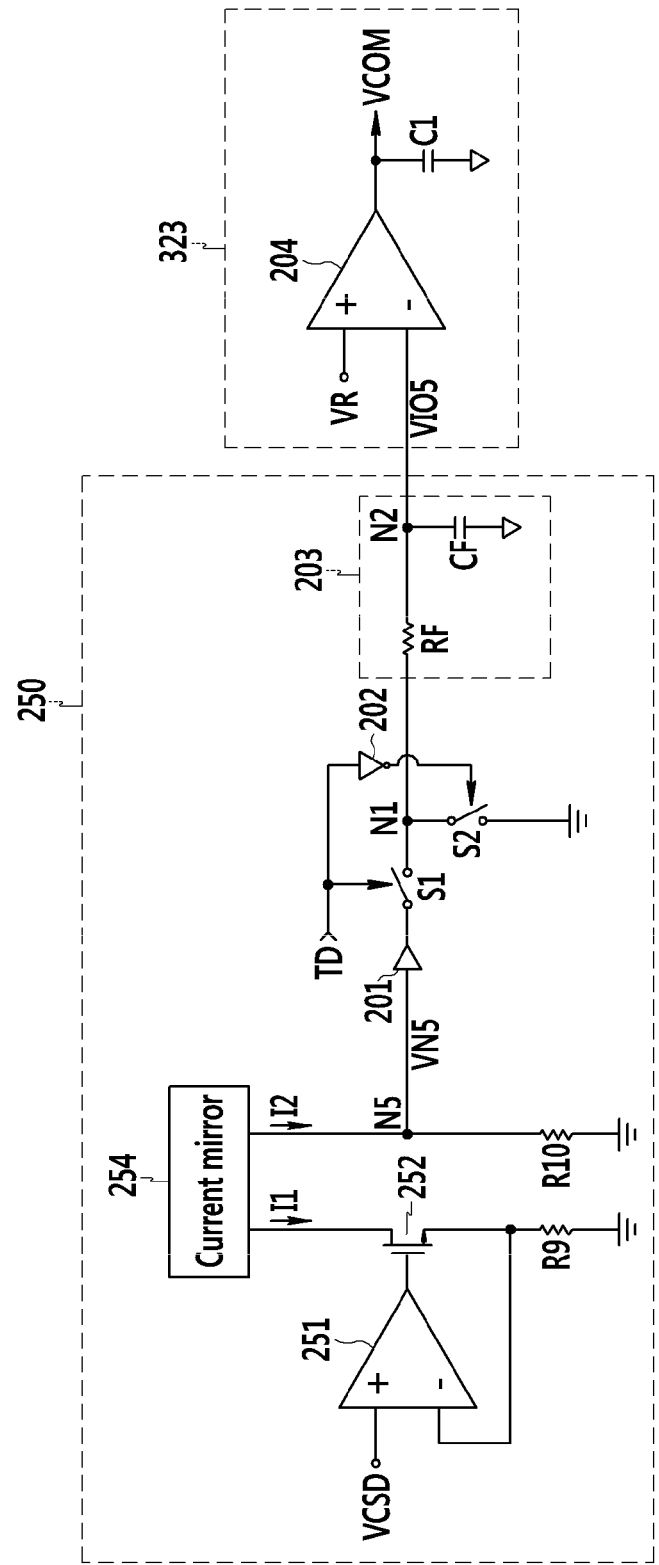
FIG. 7 is a diagram illustrating an output current estimator according to a sixth exemplary embodiment.

FIG. 7 is a diagram illustrating an output current estimator according to a sixth exemplary embodiment.

An output current estimator 250 according to a sixth exemplary embodiment further includes a current mirror 250 as compared with the first exemplary embodiment. The same configuration as the first exemplary embodiment described above is denoted by the same reference numeral and redundant description will be omitted.

The current mirror 254 amplifies a current I1 which follows the detected sensing voltage VCSD by a predetermined ratio K to generate a second current I2.

The current I1 is generated by an error amplifier 251, a transistor 252, and a resistor R9. A detected sensing voltage VCSD is applied to a non-inversion terminal (+) of the error amplifier 251 and an inversion terminal (−) of the error amplifier 251 is connected to a source of the transistor 252. An output terminal of the error amplifier 251 is connected to a gate of the transistor 252.

A resistor R9 is connected between a source of the transistor 252 and a primary side ground and a drain of the transistor 252 is connected to the current mirror 254. A voltage of an inversion terminal (−) of the error amplifier 251 is determined in accordance with multiplication of the current I1 and the resistor R9 and a voltage at the non-inversion terminal (+) is a detected sensing voltage VCSD.

The error amplifier 251 generates an output to control voltages of the non-inversion terminal (+) and the inversion terminal (−) to be equal and the transistor 252 generates the current I1 in accordance with the output of the error amplifier 251. When the voltage of the inversion terminal (−) is higher than the detected sensing voltage VCSD, the current I1 is reduced and when the voltage of the inversion terminal (−) is lower than the detected sensing voltage VCSD, the current I1 is increased, so that the voltage of the inversion terminal (−) is controlled to be detected sensing voltage VCSD. Accordingly, the current I1 is controlled to be VCSD/R9.

A current mirror 254 amplifies the current I1 at a ratio K, so that the current I2 is K*VCSD/R9. By doing this, a copied voltage VN5 generated at the node N5 is a voltage obtained by multiplying the current I2 and a resistance R10 so as to be K*R10*VCSD/R9.

The copied voltage VN5 amplified as described above is transmitted to the low pass filter 203 through a buffer 201 during a discharging period. The output current estimating voltage VIO5 which is output by the low pass filter 203 is a voltage which is amplified from the output current estimating voltage VIO of the first exemplary embodiment by a predetermined ratio (K*R10/R9).

Until now, various exemplary embodiments for estimating an output current have been described. According to the exemplary embodiments, an output current may be estimated only by a low pass filter which has a simple configuration as compared with the related art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: Power supply device
10: Switch control circuit
100: Sensing voltage detector
200: Output current estimator
203: Low pass filter
300: PWM controller

What is claimed is:

1. A power supply device, comprising:
a power switch on a primary side of the power supply;
a rectification diode on a secondary side of the power supply, the rectification diode being configured to rectify a supplied current in accordance with a switching operation of the power switch to generate an output current;
a sensing resistor from which a sensing voltage is detected on the primary side of the power supply; and
a switch control circuit configured to generate an output current estimating voltage corresponding to the output current by supplying the sensing voltage to a low pass filter in the switch control circuit during a discharging period when a current flows through the rectification diode during a switching cycle of the power switch and averaging the detected sensing voltage during the switching cycle of the power switch.

2. The power supply device of claim 1, wherein the switch control circuit is configured to generate the detected sensing voltage, by detecting a peak of the sensing voltage for every switching cycle of the power switch.

3. The power supply device of claim 1, wherein the switch control circuit is configured to generate the detected sensing voltage by at least one of calculating or detecting an average of the sensing voltage for every turn-on period of the power switch.

4. The power supply device of claim 1, wherein the switch control circuit is configured to divide the detected sensing voltage using first and second resistors in the switch control circuit, and to supply a resistively divided detected sensing voltage to the low pass filter in the switch control circuit during the discharging period, wherein the low pass filter is configured to generate the output current estimating voltage by averaging the resistively divided detected sensing voltage during the switching cycle of the power switch.

5. The power supply device of claim 1, wherein the switch control circuit is configured to supply the detected sensing voltage to the low pass filter in the switch control circuit during the discharging period, wherein the low pass filter is configured to average the detected sensing voltage during the switching cycle of the power switch and to provide the average detected sensing voltage to first and second resistors in the switch control circuit configured to generate the output current estimating voltage by dividing the average detected sensing voltage using the first and second resistors.

6. The power supply device of claim 1, wherein the switch control circuit is configured to supply the detected sensing voltage to an amplifying unit in the switch control circuit, wherein the amplifying unit is configured to amplify the detected sensing voltage and to supply an amplified detected sensing voltage to the low pass filter in the switch control circuit during the discharging period, wherein the low pass filter is configured to generate the output current estimating voltage by averaging the amplified detected sensing voltage during the switching cycle of the power switch.

7. The power supply device of claim 1, wherein the switch control circuit is configured to supply the detected sensing voltage to the low pass filter in the switch control circuit during the discharging period, wherein the low pass filter is configured to average the detected sensing voltage during the switching cycle of the power switch and to provide the average detected sensing voltage to an amplifying unit in the switch control circuit, wherein the amplifying unit is configured to generate the output current estimating voltage by amplifying the average detected sensing voltage.

8. The power supply device of claim 1, wherein the switch control circuit includes a current mirror configured to:
generate a second current by copying a first current corresponding to the detected sensing voltage at a predetermined ratio;
generate a copied voltage corresponding to the second current; and
supply the copied voltage to the low pass filter during the discharging period; and
wherein the low pass filter is configured to generate the output current estimating voltage by averaging the copied voltage during the switching cycle of the power switch.

9. A switch control circuit which controls a switching operation of a power switch of a power supply, the circuit comprising:
a sensing voltage detector configured to generate a detected sensing voltage based on a sensing voltage in accordance with a current which flows through the power switch on a primary side of the power supply; and
an output current estimator configured to generate an output current estimating voltage corresponding to an output current which is controlled in accordance with a switching operation of the power switch by averaging the detected sensing voltage,
wherein the output current estimator includes:
a low pass filter; and
a first switch,
wherein the first switch is configured to supply the detected sensing voltage to the low pass filter during a discharging period, and the discharging period is a period when the output current flows through a rectification diode on a secondary side of the power supply.

10. The switch control circuit of claim 9, wherein the sensing voltage detector is configured to generate the detected sensing voltage by detecting a peak of the sensing voltage for every switching cycle of the power switch.

11. The switch control circuit of claim 9, wherein the sensing voltage detector is configured to generate the detected sensing voltage by at least one of calculating or detecting an average of the sensing voltage for every turn-on period of the power switch.

12. The switch control circuit of claim 9, wherein the output current estimator further includes a second switch that is configured to supply a predetermined reference voltage during a remaining period except for the discharging period in the switching cycle of the power switch.

13. The switch control circuit of claim 9, wherein the output current estimator further includes first and second resistors configured to resistively divide the detected sensing voltage and supply the detected sensing voltage which is resistively divided to the low pass filter through the first switch during the discharging period.

14. The switch control circuit of claim 9, wherein the output current estimator further includes first and second resistors configured to generate the output current estimating voltage by resistively dividing an output of the low pass filter.

15. The switch control circuit of claim 9, wherein the output current estimator further includes an amplifying unit configured to amplify the detected sensing voltage and supply the amplified detected sensing voltage to the low pass filter during the discharging period.

16. The switch control circuit of claim 9, wherein the output current estimator further includes an amplifying unit configured to generate the output current estimating voltage by amplifying an output of the low pass filter.

17. The switch control circuit of claim 9, wherein the output current estimator further includes a current mirror configured to copy the first current corresponding to the detected sensing voltage at a predetermined ratio to generate a second current, generate a copied voltage corresponding to the second current, and supply the copied voltage to the low pass filter during the discharging period.

18. The switch control circuit of claim 9, wherein the switching operation of the power switch is controlled in accordance with a result of comparing a comparison voltage obtained by amplifying a difference between the output current estimating voltage, a predetermined reference voltage and any one of the sensing voltage and a triangular wave.

19. A switch control circuit which controls a switching operation of a power switch, the circuit comprising:
a sensing voltage detector configured to generate a detected sensing voltage corresponding to a sensing voltage in accordance with a current which flows through the power switch;

an error amplifier configured to amplify a difference between the detected sensing voltage and the predetermined reference voltage;

a capacitor coupled to an output terminal of the error amplifier to act as a low pass filter, wherein an output of the error amplifier is averaged by the capacitor;

a first switch; and a second switch, wherein the first switch is configured to supply the detected sensing voltage to the low pass filter during a discharging period, the discharging period is a period when a current flows through a rectification diode to generate the output current, and the second switch is configured to provide a predetermined reference voltage during a remaining period except for the discharging period in a switching cycle of the power switch.

* * * * *